(12) United States Patent
Boettner et al.

(10) Patent No.: US 7,677,271 B2
(45) Date of Patent: Mar. 16, 2010

(54) PORTABLE FLEXIBLE AND EXTENDABLE DRAIN PIPE

(75) Inventors: E. Michael Boettner, Cleveland, TN (US); Billy J. Hall, Cleveland, TN (US); Frank T. Hoffman, Cleveland, TN (US)

(73) Assignee: Cleveland Tubing Inc., Cleveland, TN (US)

( * ) Notice: Subject to any disclaimer, the term of this patent is extended or adjusted under 35 U.S.C. 154(b) by 0 days.

(21) Appl. No.: 11/446,026

(22) Filed: Jun. 2, 2006

(65) Prior Publication Data

US 2007/0051417 A1 Mar. 8, 2007

Related U.S. Application Data

(60) Provisional application No. 60/714,772, filed on Sep. 8, 2005.

(51) Int. Cl.
*F16L 11/00* (2006.01)
*B65D 85/46* (2006.01)

(52) U.S. Cl. .............. 138/119; 138/118; 138/121; 138/122; 206/321

(58) Field of Classification Search ........... 138/118, 138/119, 110, 121, 122; 206/446, 321, 69, 206/303, 806
See application file for complete search history.

(56) References Cited

U.S. PATENT DOCUMENTS

| 4,006,599 | A | | 2/1977 | Hegler | 425/296 |
|---|---|---|---|---|---|
| 4,082,327 | A | | 4/1978 | Sting | 285/401 |
| 4,557,510 | A | | 12/1985 | Overmyer | 285/305 |
| 4,629,641 | A | * | 12/1986 | Paullin | 428/36.9 |
| 4,771,884 | A | * | 9/1988 | Lamborn et al. | 206/321 |
| 4,921,105 | A | * | 5/1990 | Culbreth | 229/117.16 |
| 4,969,670 | A | | 11/1990 | Bonnema | 285/319 |
| 4,987,996 | A | * | 1/1991 | Anderson | 206/321 |
| 5,015,515 | A | * | 5/1991 | Paulin | 428/36.8 |
| 5,071,173 | A | | 12/1991 | Hegler | 285/138 |
| 5,311,753 | A | * | 5/1994 | Kanao | 68/208 |
| 5,507,319 | A | * | 4/1996 | Kanao | 138/110 |
| 5,707,088 | A | | 1/1998 | Miller | 285/345 |
| 5,813,701 | A | | 9/1998 | Noble | 285/4 |
| 5,829,916 | A | | 11/1998 | Evans | 405/43 |
| 5,915,735 | A | | 6/1999 | Noble | 285/4 |
| 6,041,825 | A | * | 3/2000 | Smith et al. | 138/109 |
| 6,223,777 | B1 | * | 5/2001 | Smith et al. | 138/109 |
| 6,644,357 | B2 | | 11/2003 | Goddard | 138/121 |
| 6,840,285 | B2 | | 1/2005 | Toliver | 138/121 |

* cited by examiner

*Primary Examiner*—Patrick F Brinson
(74) *Attorney, Agent, or Firm*—Miller & Martin PLLC

(57) ABSTRACT

A flexible collapsible corrugated drain pipe has a corrugation structure that permits a tight bending radius and relatively facile collapsing and expansion of corrugations, thereby permitting convenient manipulation and installation of drain pipe and packaging, display, storage and transportation of the collapsed pipe sections.

9 Claims, 11 Drawing Sheets

PORTABLE FLEXIBLE AND EXTENDABLE DRAIN PIPE

The present application claims priority to U.S. Provisional patent application Ser. No. 60/714,772 filed Sep. 8, 2005, which is incorporated herein by reference.

FIELD OF THE INVENTION

This invention relates to plastic drain pipe. In particular, the invention relates to a drain pipe particularly designed to provide a flexible and extendable pipe and to facilitate both the packaging and the connections of pipe segments.

BACKGROUND OF THE INVENTION

This invention is directed to providing an improved drain pipe, and particularly to providing an improved drain pipe of the type used in the drainage of soil and the transportation of surface water by gravity for agricultural, septic, residential, civil construction, or recreational purposes. Typical product sold to residential end users is nominally four inches in diameter and sold in ten foot straight lengths or in rolls of 50 to 300 feet in length. Typically, the color is black and the material is high density polyethylene (HDPE). The plastic drain pipe is corrugated on the exterior and may or may not have a smooth interior wall. Both straight lengths and rolls of the corrugated pipe are not collapsible, and as a result are bulky. Some types of corrugated pipe require connectors to join pieces or elbows to cause the pipe to hold a curved position. Pipe sold in rolls tends to retain a memory making it difficult to place in a trench without elbows or weighting the pipe sections down with ballast such as rocks or a building block. Both the straight lengths and rolled corrugated pipe need to be cut to length. Corrugated pipe sections that are adapted to connect with adjacent sections often utilize proprietary connecting configurations and are rendered inoperable with pipe sections manufactured by other suppliers.

In the field of gutter downspouts, collapsible corrugated tubing has been utilized by Gutter. World, Inc. as reflected in U.S. Pat. Nos. 5,813,701; 5,915,735; 6,041,825; and 6,223,777. These downspout extensions have male and female rectangular end sections to connect with gutter downspouts and adjacent extensions. In addition, the corrugated collapsible downspout extension pipes have only been used in relatively short lengths, approximately six to eight feet long when fully extended, have utilized thick wall corrugations, and have utilized a profile that did not optimize either the collapse ratio or the bend radius of the product. It is believed that the downspout extension products have only been sold in a straight collapsed configuration which, with non-collapsible end sections, results in a longitudinal product between two and three feet in overall length.

Gutter World, Inc. has also manufactured a rectangular profile collapsible gutter spout tubing in lengths of less than about two feet when fully extended. Although this rectangular product approximates some measurements in its straight walled corrugations to the annular corrugations of the present invention, rectangular corrugated products have inherently irregular wall thicknesses. When fabricated on a corrugator, the midpoints of straight walls are thicker than the walls near corners, and thus the entire tubing must be made with relatively thick walls to ensure adequate coverage in the corner areas. This leads to thicker midpoints of walls in comparison to the corners, causing the resulting rectangular product to collapse irregularly.

Most other collapsible corrugated tubing has been constructed for medical uses in smaller diameter sizes such as about 1 to 1.5 inches. These tubings are much smaller and lighter than drainage tubing, which typically has a diameter at least about 3 inches and must possess some rigidity so that it is not crushed when buried in a trench. Due to the relatively small sizes and thin walls of these prior collapsible tubes, it has been possible to work with small tubes even when they were not optimized for portability and ease of manipulation.

SUMMARY OF THE INVENTION

It is therefore an object of the invention to provide a collapsible drain pipe that may provide one or more of the following benefits: ease of use and handling; improved corrugation profile for manufacturing and performance characteristics; and convenient packaging and storage.

In furtherance of these objectives, a collapsible corrugated drain pipe is disclosed with integrated male and female cuff sections at opposed ends and having therebetween a central section of collapsible and extendable rings alternating between a large diameter and a small diameter to allow the pipe to be fixedly directed in desired orientations, extended or reduced in length, and to be folded and packaged for convenient sale and handling.

BRIEF DESCRIPTION OF THE DRAWINGS

The invention may be better appreciated with reference to the following drawings in which like numerals refer to like elements throughout the several views.

DETAILED DESCRIPTION OF THE INVENTION

Figure 1:
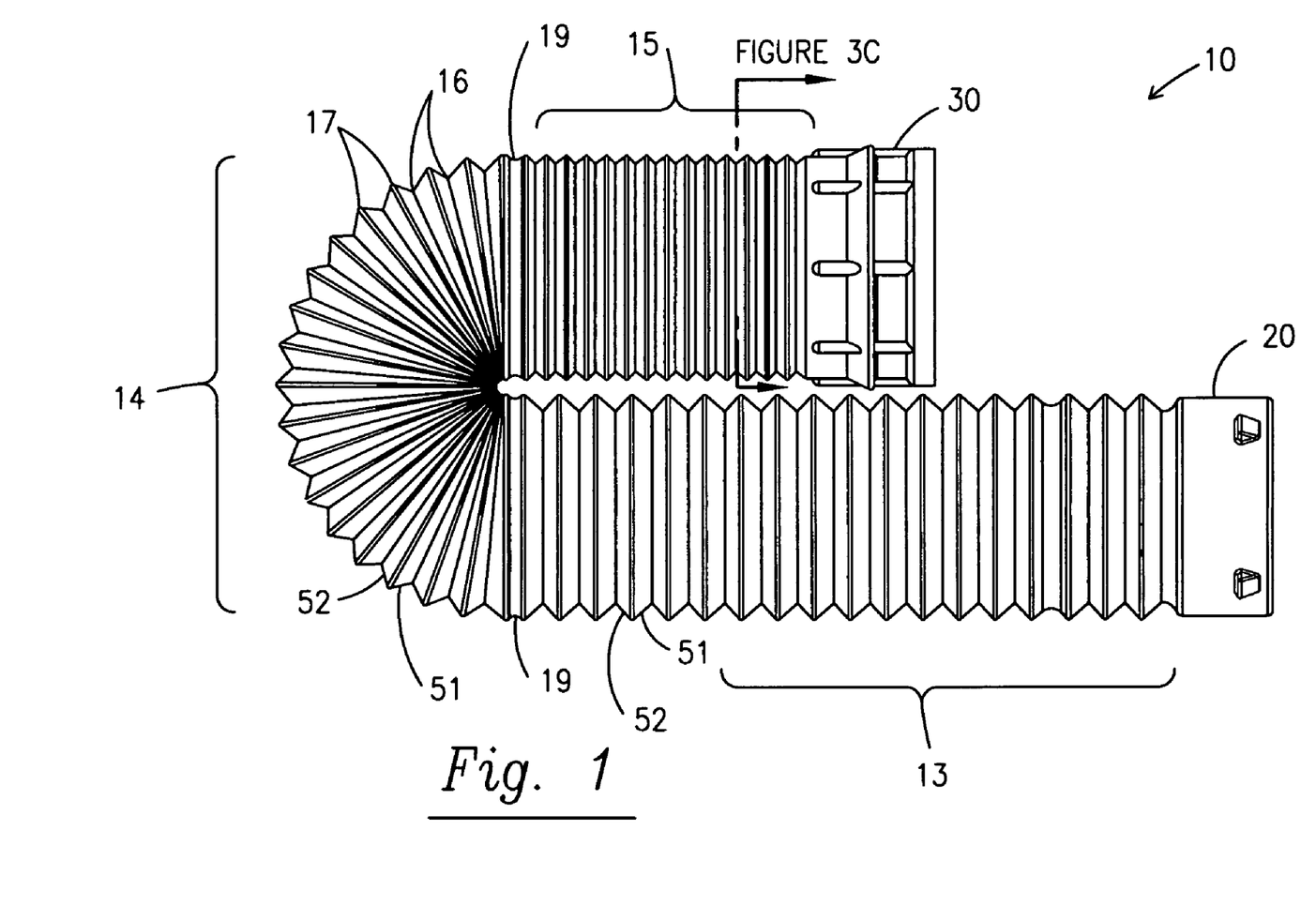
FIG. 1 is a side view of an embodiment of the present invention bent to demonstrate the flexibility of the tubing.

Referring now to the drawings, FIG. 1 depicts an exemplary drain pipe 10 according to the present invention with a first male end section such as cuff 20 and an opposite female end section such as cuff 30 positioned about an intermediate collapsible portion 12 comprised of a plurality of annular corrugations of alternating smaller, minimum or minor diameter rings 16 separated by larger, maximum or major diameter rings 17 being respectively connected by alternating static walls 51 and tuck walls 52 to permit a section of the pipe to be in: an extended state 13; a collapsed state 15; or a curved or directed state 14. An enlarged view of expanded corrugations is shown in FIG. 3B, and an enlarged view of collapsed corrugations is shown in FIGS. 3C and 3D. Generally, the drain pipe is in a compressed state when the corrugations are collapsed so that tuck sides 52 are folded inward against static sides 51 as shown in FIG. 3D. The drain pipe is in expanded state when tuck sides 52 are folded outward apart from static sides 51 to the extent possible, generally achieving an angular orientation between the tuck and static sides of about 90°, and possibly even a slightly greater angular orientation. Of particular note are tooling points, shown as uncollapsible rings 19 with reverse arch shapes, which are desirable for aiding in the manipulation of the tubing for packaging.

Figure 2A:
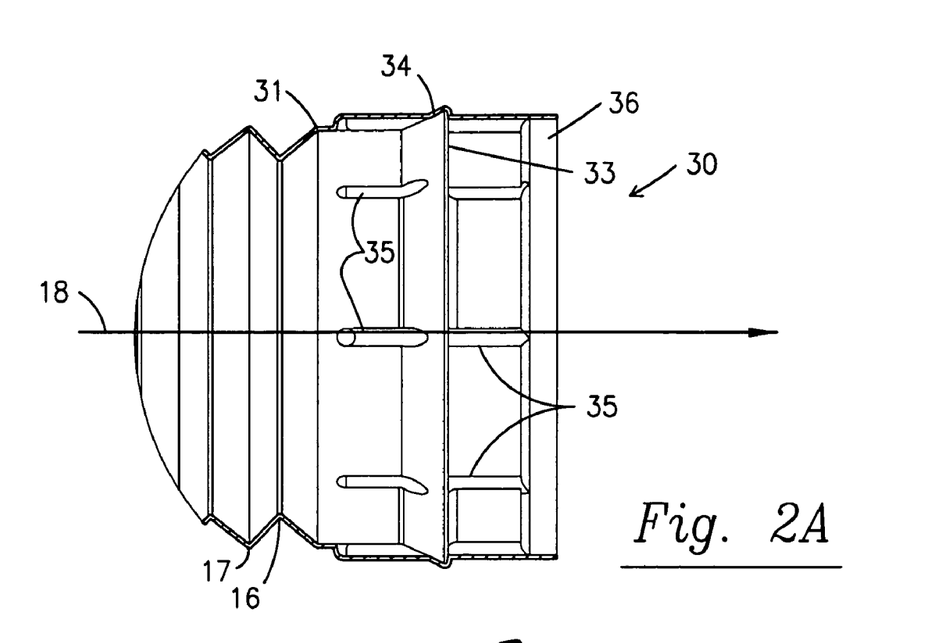
FIG. 2A is a side sectional view of the female end section of the drain pipe shown in FIG. 1.
Figure 2B:
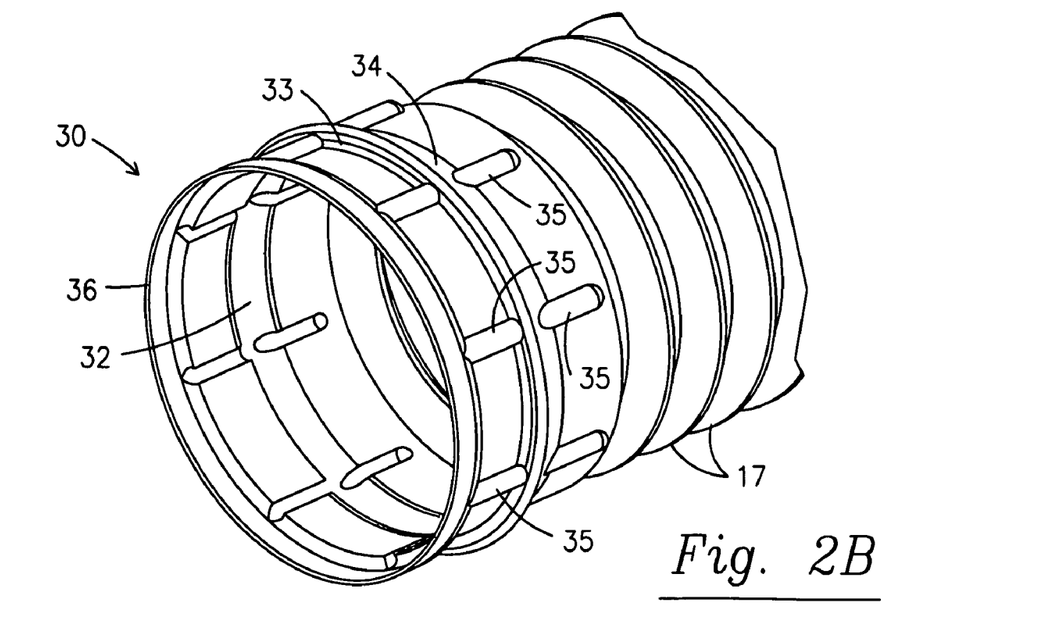
FIG. 2B is a perspective view of the female end section of the drain pipe shown in FIG. 2A.
Figure 2C:
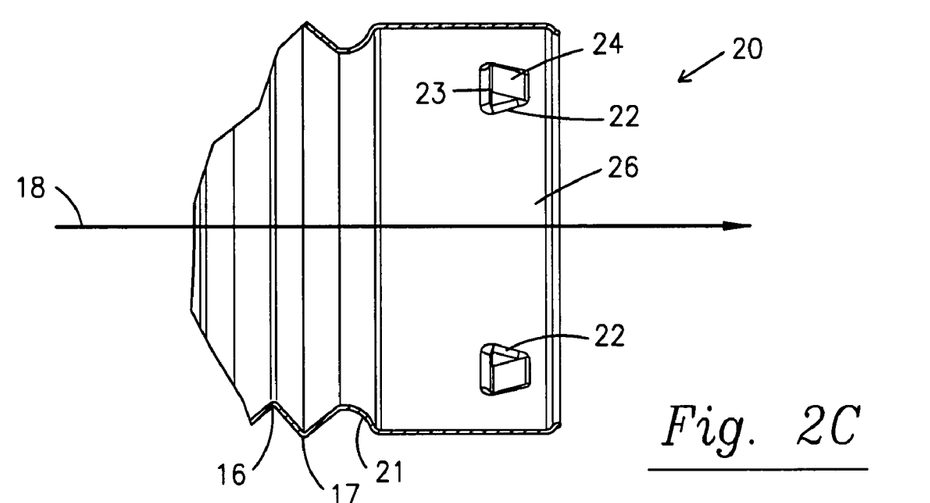
FIG. 2C is a side sectional view of the male end section of the drain pipe shown in FIG. 1.
Figure 2D:
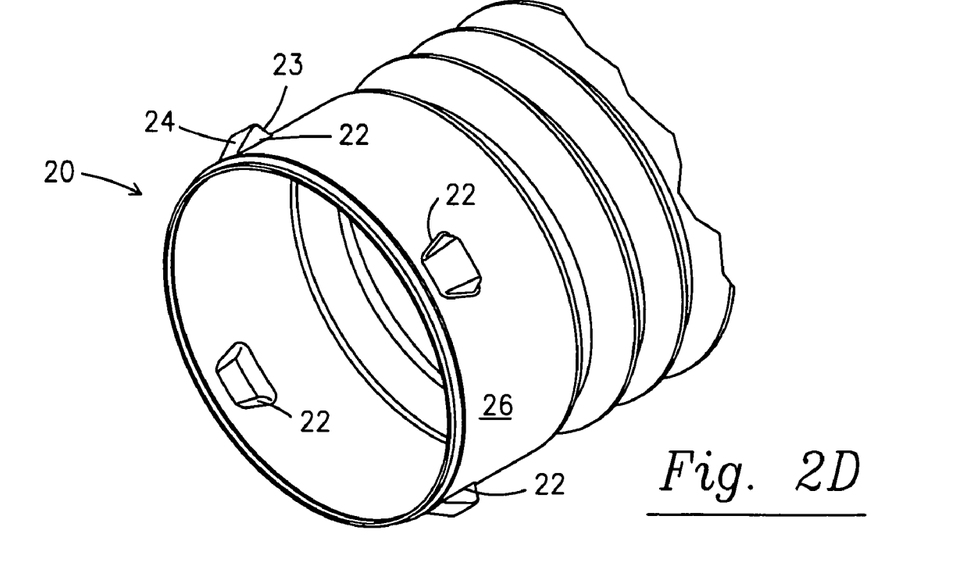
FIG. 2D is a perspective view of the male end section of the drain pipe shown in FIG. 2C.

Turning then to FIGS. 2A, and 2B, a female end section such as cuff 30 is shown with interior channel 32 defined by externally sloped wall 34 and side wall 33 which is nearly normal to the longitudinal axis 18 of the cuff 30. A transition section 31 connects cuff 30 to the expandable portion of the pipe 10, where cuff 30 will typically join either a small ring 16 or large ring 17. The walls of cuff 30 are reinforced by structural supports 35, and toward the end of the cuff 30 beyond channel 32 is an end lip 36. The channel 32 preferably extends annularly about the entire interior of cuff 30 so that it may engage with detents or flanges of a variety of configurations of male end sections manufactured by drain pipe producers.

FIG. 2B illustrates a male end section such as male cuff 20 again having a transition section 21 to engage with the expandable section of the pipe at a small ring 16 in the illustrated diagram. Detents 22 are oriented about the cuff 20, preferably separated by 90° of angular orientation. Detents are formed by forward sloping sides 24 and rear sides 23 that are nearly normal to the longitudinal axis of cuff 20. Forward of the detents 22 is the front lip. It will be seen that pipe sections may be joined by interfitting front lip 26 of male cuff 20 within the end lip 36 of female cuff 30 and pushing male and female cuffs together until detents 22 are engaged within channel 32 of female cuff 30. Alternative detent configurations are possible on the male cuff, and the illustrated configuration is selected in order to provide the capability of engaging with a variety of companies' drain pipe fittings.

Figure 3A:
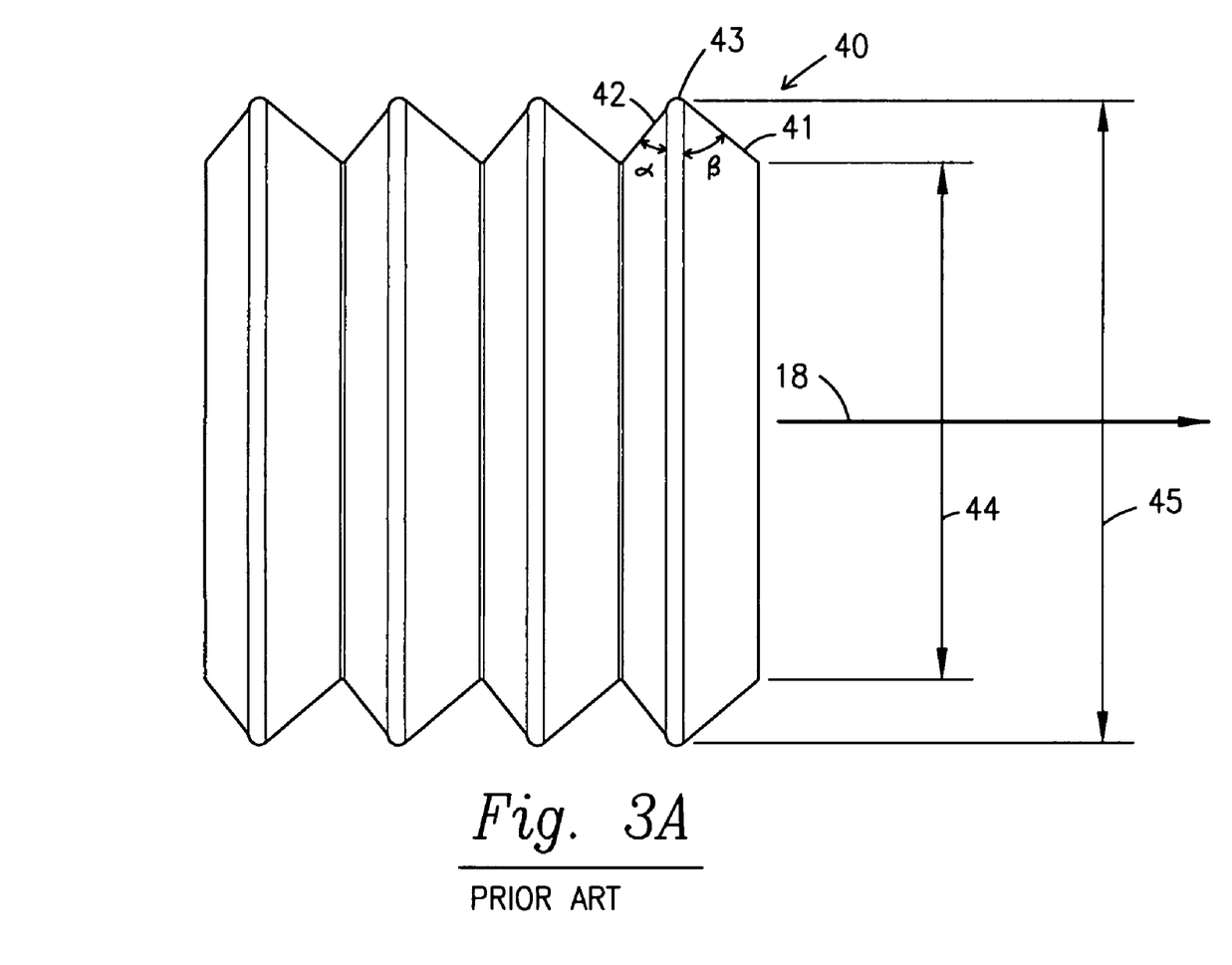
FIG. 3A is an enlarged view of expanded corrugations of a prior art large diameter collapsible gutter extension in isolation.
Figure 3B:
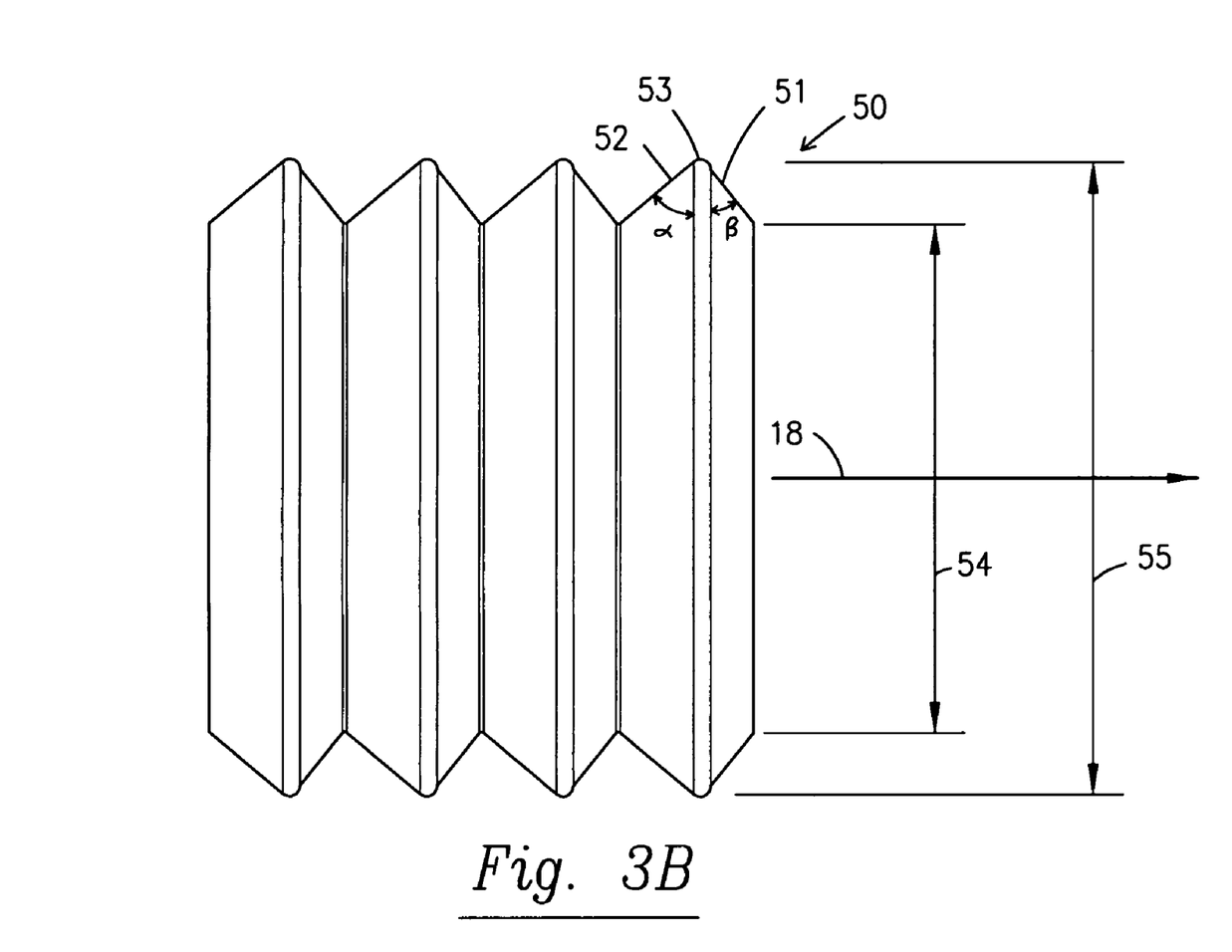
FIG. 3B is an enlarged view of expanded corrugations of the drain pipe of FIG. 1 in isolation.
Figure 3C:
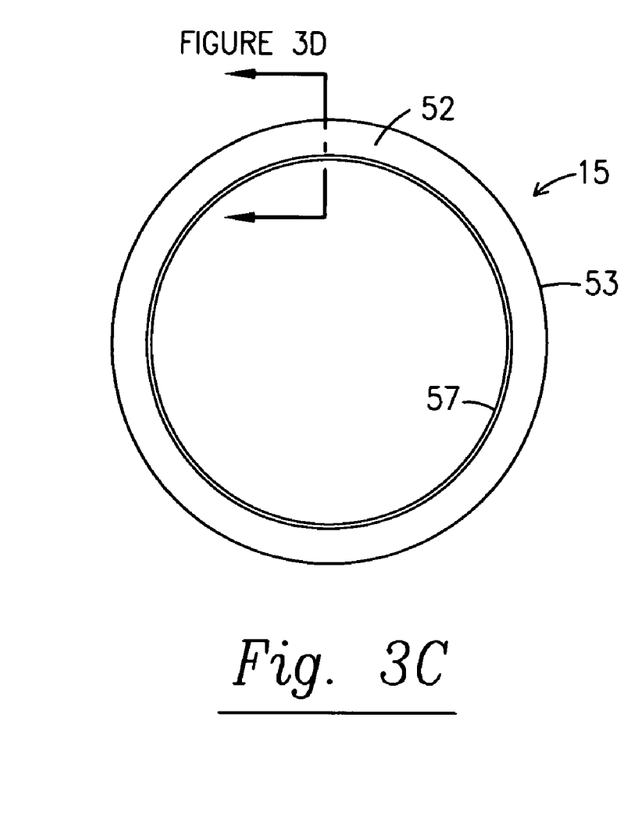
FIG. 3C is a sectional view of the corrugations of the drain pipe of FIG. 1 taken along the line C-C.
Figure 3D:
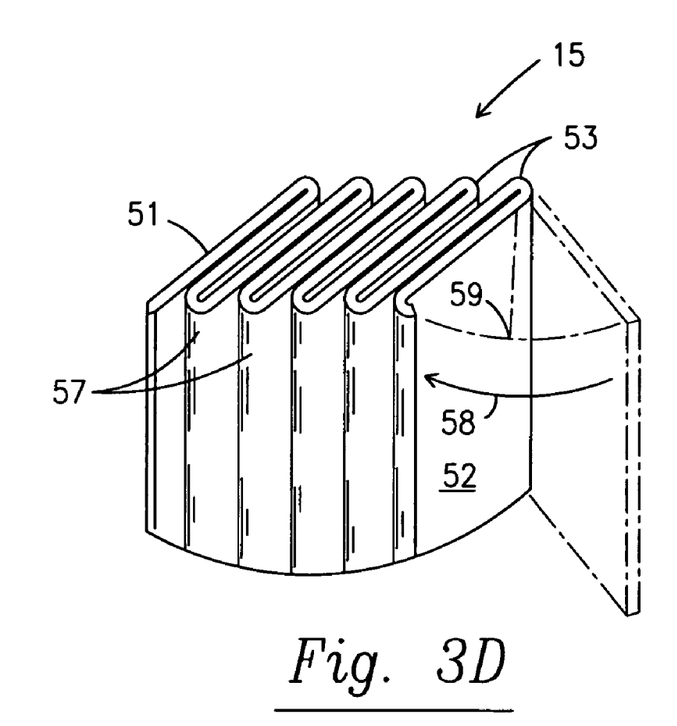
FIG. 3D is an enlarged view of collapsed corrugations of the drain pipe of FIG. 3C.

FIGS. 3A-3G illustrate a variety of corrugation styles utilized in collapsible tubing. FIGS. 3A and 3E-G illustrate prior art. The prior art corrugation design in FIG. 3A is utilized in the commercial embodiments of the Flex-A-Spout brand product sold by Gutter World, Inc. These corrugations consist of a tuck wall 42 connecting a smaller diameter ring 44 to a larger diameter ring 45 and having a hinge 43 connecting to a static wall 41, the static wall connecting the larger diameter ring 45 to the next smaller diameter ring 44. The illustrated hinge 43 is a bubble hinge intended to make the folding of the tuck wall 42 against the static wall 41 easier and require less force. The compression ratio of the tubing is determined by the tuck and static angles $\alpha$, and $\beta$, as well as the radius of the hinge 43, the length of the tuck side wall 42 and the length of the static side wall 41. In the typical Flex-A-Spout configuration, the smaller ring inner diameter is 3.664 inches, the length of the tuck wall 42 including the 0.009 inch height of bubble hinge 43 is 0.504 inches, and the length of the static wall 41 is 0.704 inches. The larger diameter ring 45 has an inner diameter of 4.590 inches. In expanded state, the tuck wall 42 is at an angle of about 49.93° with the longitudinal axis 18 of the pipe 10 so that the tuck angle $\alpha$ is 40.07°. The static side is at an angle of 39.1° with the longitudinal axis 18 so that the static angle $\beta$ is 50.9°. The sum of $\alpha$ and $\beta$ is about 91°. The expanded width of a single corrugation is 1.0 inches.

A greater variation in size between larger ring 45 diameter and smaller ring 44 diameter produces threefold effects. First, the longer distance between interior pivot hinges 47 and outer hinges 43 means that when manufacturing corrugated tubes, the HDPE, or other plastic being applied, will tend to be thicker at the interior hinges 47 and thinner at the outside hinges 43. Indeed, at the interior hinges 47 the tubing of FIG. 3A achieves a thickness near 0.035 inches, but at the outside hinges 43 thins to near 0.020 inches in places. This variance in wall thickness is partially attributable to the large ratio between static wall length and the large ratio between large and small ring diameter. This gives rise to the possibility of inadequate thickness at the outside hinges 43 and the possibility of product defects. The greater thickness at interior hinges 47 may make it more difficult to collapse those hinges, and may require hinges to have large radii to permit the walls 41, 42 to fold together when the corrugation is collapsed. Finally, when the tuck wall 42 swings across the tuck and static angles to close against static wall 41, it is necessary for the tuck wall 42 to flex or the smaller ring 44 to compress so that the tubing can collapse. The greater the difference between smaller diameter ring 44 and larger diameter ring 45, the greater the amount of tuck wall 42 flex and inner diameter ring 44 compression required. If thin walled tubing is used, collapsing can be irregular with a resulting potato chip type appearance of larger ring edges instead of closely spaced and vertically aligned ridges. When utilizing the dimensions of the corrugation described in FIG. 3A, relatively thick walls are required and, in fact, it becomes impractical to collapse any substantial length of expanded drain pipe without the use of special devices and it is similarly difficult to expand any substantial length of pipe. Indeed, frequently fifteen pounds of force is required to expand a collapsed corrugation of the pipe of FIG. 3A. In particular, to overcome the shortcomings of the prior art, the present drain pipe invention can be advantageously practiced with the corrugation design illustrated in detail in FIG. 3B.

Some background about the measurements applied to corrugated tubing is helpful to their understanding. Corrugated tubing is manufactured in expanded state, typically on a corrugator. Then the expanded tubing is collapsed, and some permanent deformation occurs. If the collapsed tubing is again expanded, it will not reach its original manufactured length but will typically be about 5%-15% shorter. Subsequent collapsing and expansion does not significantly alter the tubing's length. Accordingly, all measurements are taken after the tubing has been collapsed and then re-expanded after manufacture.

For the Flex-A-Spout tubing described in FIG. 3A, the following characteristics are observed:
Ratio of static angle $\beta$ to tuck angle $\alpha$=127%
Sum of $\alpha$ and $\beta$=91°
Collapse ratio=less than 4.5
Bend radius=6.625 inches
Ratio of bend radius to maximum diameter=144.3%
Maximum diameter=4.59 inches
Minimum diameter=3.664 inches
Ratio of maximum diameter to minimum diameter=125.27%
Length of static wall=0.704 inches Length of tuck wall=0.504 inches Ratio of static wall to tuck wall=139.6%

FIG. 3B shows expanded corrugations with tuck wall 52 having a length of 0.38 inches, and connected at hinge 53 to static wall 51 having a length of 0.445 inches. Tuck wall 52 is at an angle of 47.82° with longitudinal axis 18 of drain pipe 10 so that tuck angle $\alpha$=42.18° and static wall 51 is at an angle of 39.98° with longitudinal axis 18 so that static angle $\beta$=50.02° thereby resulting in a combined angle of 92.2° being formed between tuck wall 52 and static wall 51. The minor rings 54 have inner diameter of 3.494 inches and the major rings 55 have inner diameter of 4.09 inches. The shorter wall lengths and lesser difference between diameters of minor rings 54 and major rings 55 facilitate the collapsing of the corrugation, as does the thinner wall thickness of about only 0.035 inches that is required due to the simple hinge 53 and shorter distance between smaller and larger rings 54, 55, in comparison to the walls of the embodiment of FIG. 3A. A relatively uniform wall thickness can be produced on a corrugator. Each corrugation has a width of about 0.667 inches in expanded form. The corrugation of FIG. 3B is shown in collapsed form in FIGS. 3C and 3D. FIG. 3D is an enlarged view of one end of the section of FIG. 3C taken along line D-D. FIG. 3D shows how the tuck wall 52 moved from its original position shown in phantom through the arc 58 pivoting at hinge 53 so that tuck wall 52 folds against static wall 51. As the tuck wall 52 proceeded along arc 58 at the position 59, at which time tuck wall 52 is substantially aligned with the lateral axis or diameter of a major ring 55, the greatest pressure is exerted to bend tuck wall 52 and compress minor ring 54 so that the tuck wall 52 and smaller ring 54 defined by interior hinge 57 could pass through and be collapsed. In the corrugation design described in FIGS. 3B-3D, expansion of corrugations manually can be reasonably achieved as a force of only about ten pounds is required in comparison to the fifteen pounds of force required for the embodiment described in connection with FIG. 3A. In addition, the bend radius is only 4.5 inches compared to a bend radius of 6.625 inches of configurations of FIG. 3A.

Thus for this example of collapsible drain pipe, the following measurement are applicable:

Wall thickness=0.035 inches

Collapse ratio=5.1

Bend radius=5.5 inches

Ratio of bend radius to maximum diameter=1.34

Maximum diameter=4.09 inches

Minimum diameter=3.494 inches

Ratio of maximum diameter to minimum diameter=117%

Length of static wall=0.445 inches

Length of tuck wall=0.380 inches

Ratio of static wall to tuck wall length=117.1%

In particular, a number of desirable characteristics are demonstrated, which provide advantages individually and in combination. For a collapsible drain pipe, it is desirable that the wall thickness be less than 0.04 inches. It is also desirable that the collapse ratio of the corrugated sections be at least about 5. Of particular significance for packaging, and precise deployment, it is desirable to achieve a ratio of bend radius to maximum diameter of less than 1.5, and preferably less than 1.40 or 1.35. The illustrated embodiment achieves a ratio of static wall to tuck wall length of less than 1.2 at about 117.1%. The ratio of the length of the static wall to the tuck wall is preferably less than 1.35, 1.30, 1.25 or 1.20. The sum of the angles $\alpha$ and $\beta$ should be less than 110° and preferably less than 100°. Tuck angle $\alpha$ should be at least 3° less than static angle $\beta$, and the ratio of $\beta$ to $\alpha$ should be less than 1.25 and preferably less than 1.20. The force required to expand a corrugation should be no more than about twelve or even ten pounds of force. The ratio of the maximum diameter to minimum diameter and the ratio of static wall to tuck wall length can also be optimized to be similar, within about 10% of one another.

Figure 3E:
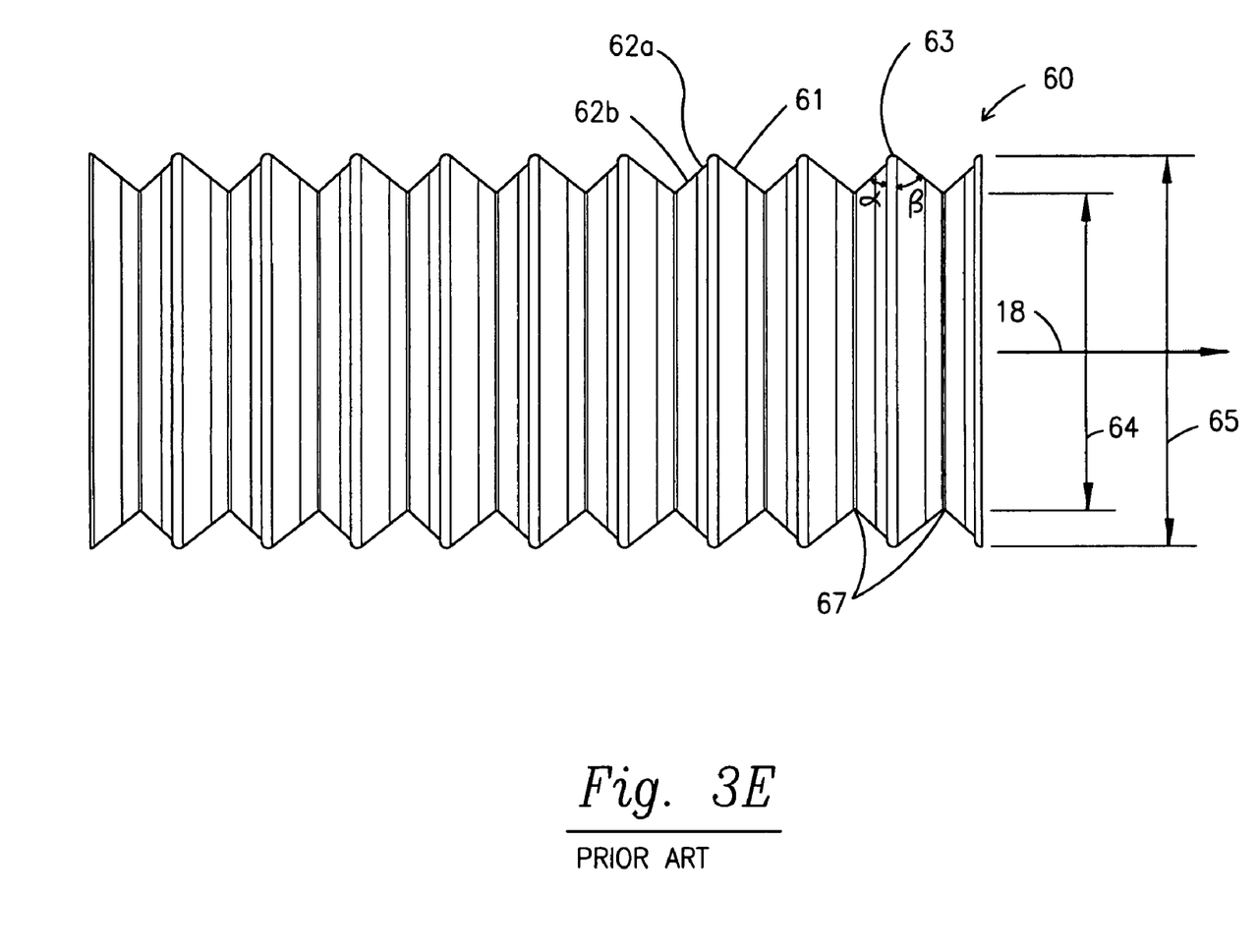
FIG. 3E is a side view of prior art corrugations for small diameter tubing including a bent tuck edge.

FIG. 3E illustrates another prior art corrugation design 60 with static wall 61 at 0.138 inches, hinge 63 and tuck wall having a first portion 62a and a second portion 62b at slight angle. This allows the total tuck angle $\alpha$ of 48.65° between second tuck wall portion 62b and the longitudinal axis 18 of pipe 10 to be greater and the reach obtained between the interior hinges 67 to be greater than would otherwise be allowed by the hinge 63. In this design, the static wall has a length of 0.195 inches and a static angle of 51.51°, a maximum diameter of 1.326 inches and a minimum diameter of 1.064 inches. However, this corrugation design has been used only with small diameter tubing, on the order of one inch or less, with correspondingly reduced wall thicknesses, on the order of 0.020 inches. When used on larger diameter tubing, there appears to be no practical effect in the collapsibility or compression ratio of the tubing, as compared to that achieved by a straight tuck wall extending to the same end point. Small diameter tubing on the order of less than two inches in diameter is not fairly comparable with the three to five inch diameter tubing used in drain pipes because the force to collapse the smaller thin walled tubing is much less, even if the smaller tubing is not optimally designed, and storage concerns are not as severely implicated.

Figure 3F:
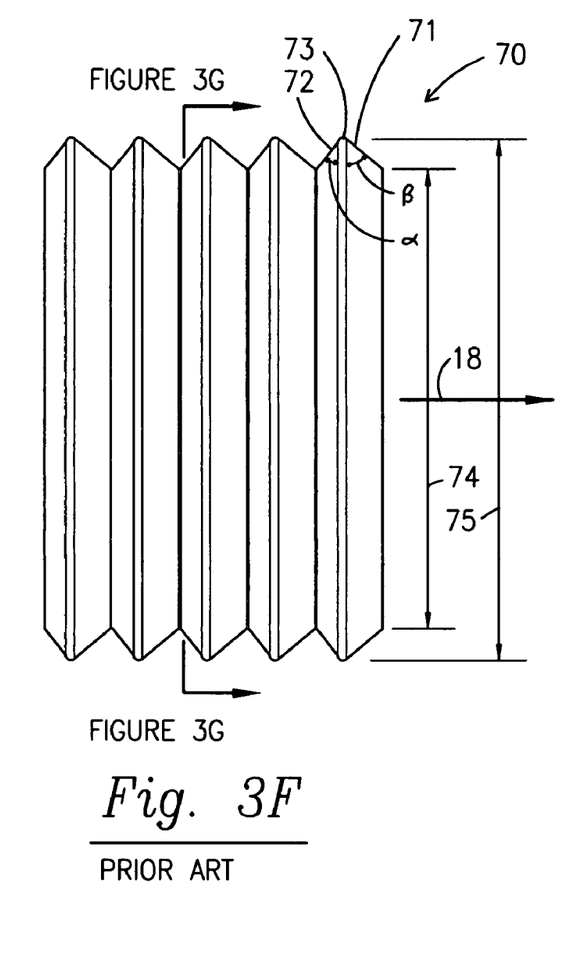
FIG. 3F is a prior art side view of rectangular gutter tubing.
Figure 3G:
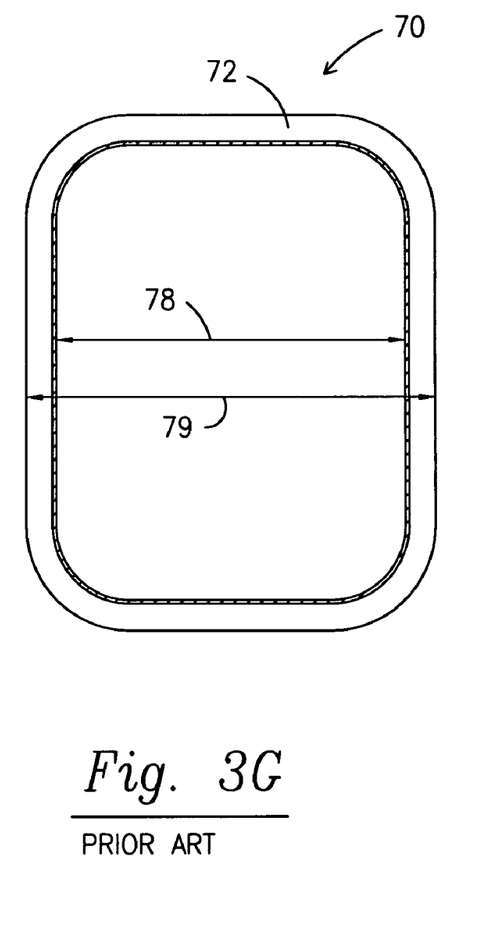
FIG. 3G is an end view of the corrugations of FIG. 3F.

The other principal prior art gutter spout design pipe configuration is of a generally rectangular shape as shown in FIGS. 3F and 3G. This tubing 70 has a tuck angle $\alpha$ of 43.9° and a static angle $\beta$ of 50.0 for a combined angle of 93.9° and a ratio of $\beta$ to $\alpha$ of almost 114%. The tuck wall 72 has a length of 0.320 and the static wall 71 a length of 0.445 for a ratio of static wall to tuck wall of over 139%. Each corrugation has a width of about 0.645 inches in expanded form.

Due to the rectangular shape, this pipe 70 has different ratios and performs differently along its major (vertical) and minor (horizontal) axes. Specifically, along the major axis, the maximum diameter 75 is 4.978 inches and the minor diameter 74 is 4.382 so that the ratio of maximum to minor diameter is 113.6%. The bend radius in this direction is 8.5 inches, or a ratio of over 170% to the maximum diameter. In the direction of the minor axis, the minimum diameter 78 is 3.387 inches and the maximum diameter 79 is 3.923 inches so that the ratio of maximum to minor diameter is nearly 118%. The bend radius is 6.25 inches so that the ratio of bend radius to maximum diameter is 159.3%.

In order to utilize the drain pipe of the invention, typically a trench is excavated to a desired depth, including the thickness of the pipe plus the thickness of bedding material to place beneath the pipe and the haunching and backfill to be placed above the pipe. Because the pipe with corrugation according to FIGS. 3B-3D can bend around a 4.5 inch radius, it is possible to plot a very direct route for excavating the trench. The pipe may also be provided with holes in the side wall so that it may receive drainage through the side wall, especially the upper side wall. Although if used in septic applications, the pipe may allow drainage out through the side wall, especially the lower side wall.

After the trench is prepared at appropriate grade to allow for drainage, and large rocks are removed from the bottom or sides of the trench, then bedding material to provide firm but not hard support for the drain pipe is placed in the trench. If the unexcavated bottom of the trench is used as bedding, it should be relatively flat and free of large rocks or obstructions. Then, the drain pipe is extended to its full length by bending it to the right and the left while pulling. Generally, no more than about ten pounds of force is required. If the length is longer than one pipe section, then male 30 and female 20 cuffs are snapped together from adjacent pipe sections. The pipe is laid along the side of the trench and the pipe is bent by collapsing one side as necessary to form the desired shape. The excess pipe may be trimmed with a knife or other cutting instrument, or unneeded length may be left in collapsed form, and the pipe dropped into place in the trench. Then haunching is preferably added on either side of the pipe and covering the pipe. Then layers of backfill are added and compacted in layers until the drain pipe is covered by the desired depth.

Figure 4A:
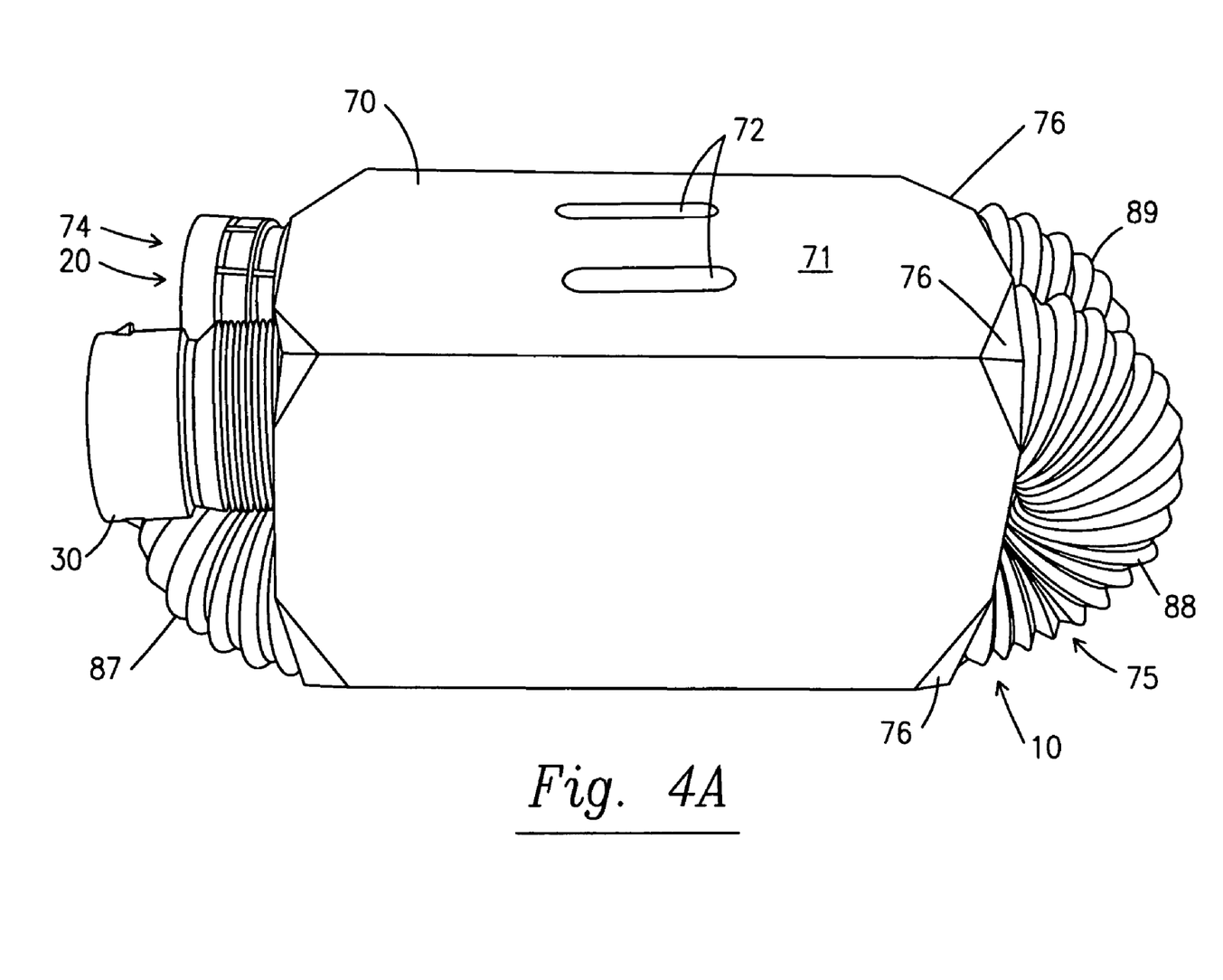
FIG. 4A is a representative packaging design for collapsible drain pipe according to the present invention.
Figure 4B:
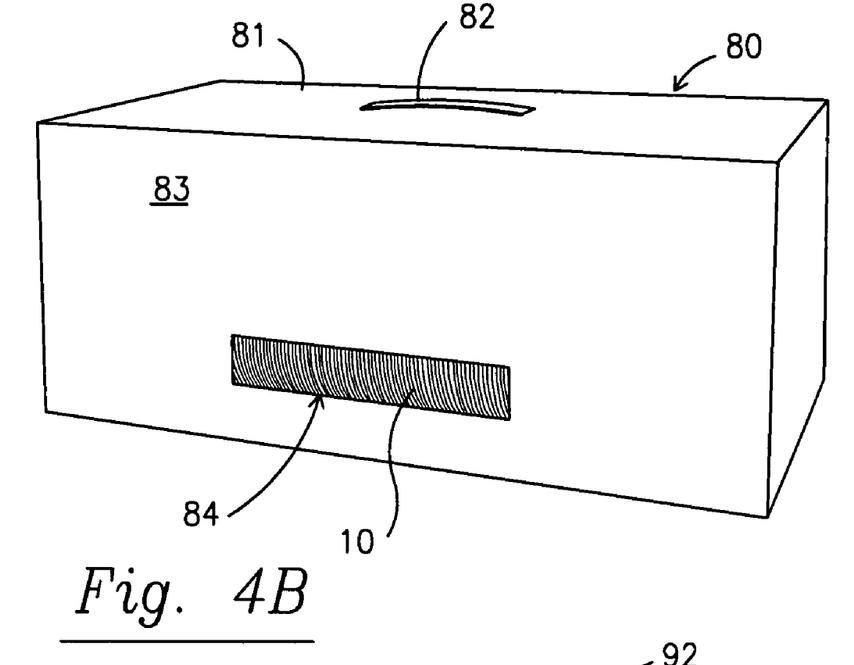
FIG. 4B is an alternative packaging design for collapsible drain pipe according to the present invention.
Figure 4C:
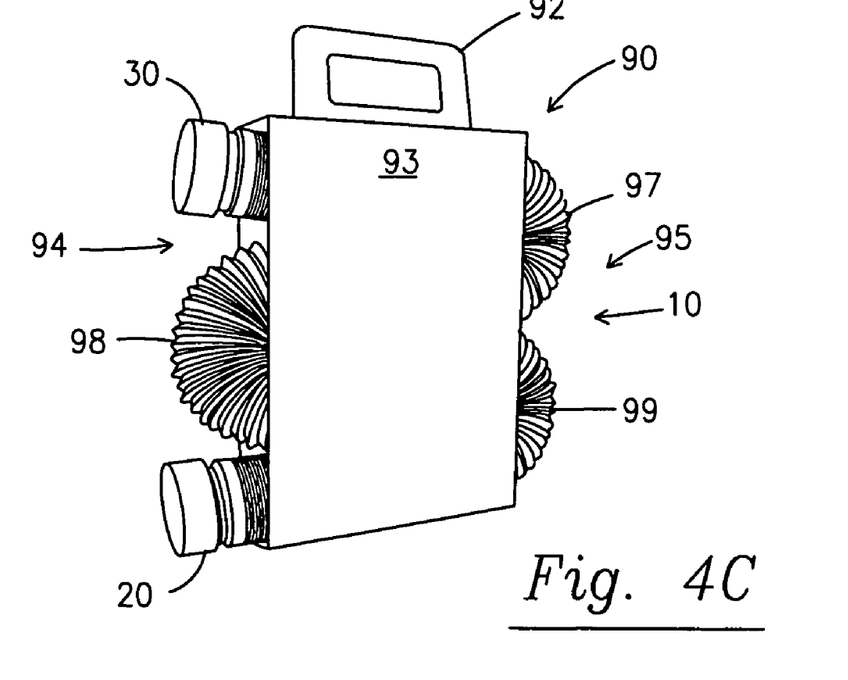
FIG. 4C is another alternative packaging design for a collapsible drain pipe according to the present invention.

A particular advantage of the bend radius achieved by expandable flexible drain pipe is illustrated in FIGS. 4A-4C. The drain pipe may be oriented lengthwise in compressed form and bent in half to form a first bend 87 placing the female cuff 20 and male cuff 30 adjacent to one another. Then the bent pipe may be bent again to form second and third bends 88, 89 resulting in the cuffs 20, 30 being adjacent to the first bend 87. This results in the drain pipe 10 being configured as four lengths of compressed tubing that may be encircled by a four panel box 70 advantageously having a top panel 71 with a grip such as handhold 72. The open front end 74 and open rear end 75 of the four panel box enables the drain pipe 10 to be easily inspected by consumers. Fold-in corners 76 of the box provide some rigidity to the structure and the resulting generally rectangular assembly is easily stacked on retailer shelves, in carts and in consumer vehicles for transport. To achieve this compact packaging form, it is desirable that the drain pipe have a ratio of bend radius to major diameter of no more than 1.4, and desirable results are obtained when this ratio is less than 1.35, 1.30, 1.25, 1.20 and 1.15. When packaged, the length of each compressed segment of tubing is preferably no more than 24 inches to optimize palletizing of the packaged tubing for shipment.

Figure 5:
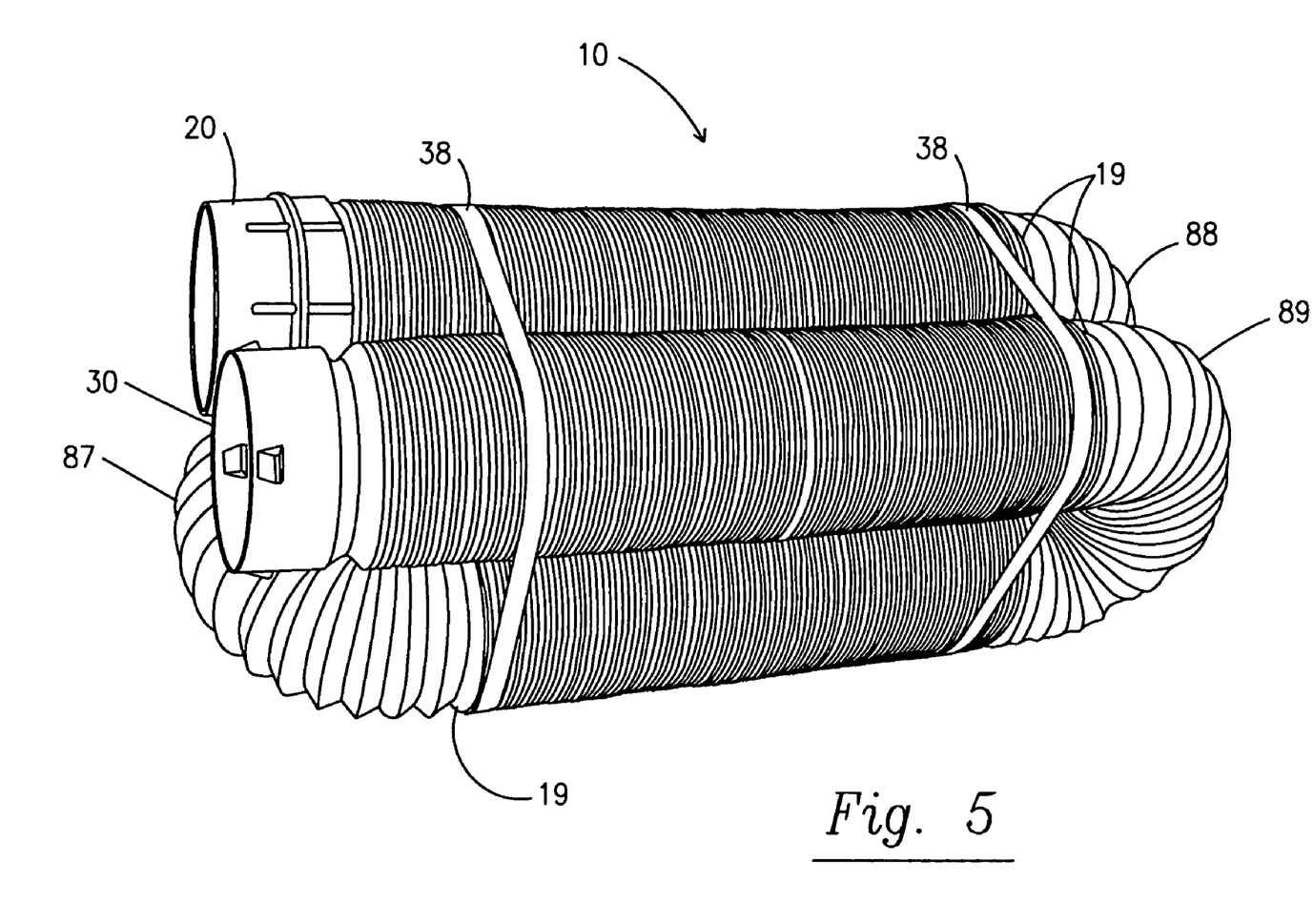
FIG. 5 is an illustration of the folding and securing of a drain pipe according to the present invention for use in the packaging of FIGS. 4A or 4B.

Alternative packaging configurations are also possible such as rectangular box 80 having a top panel 81 and handle 82, side panel 83 with window 84 permitting consumer inspection of drain pipe 10. Typically, the drain pipe is again folded with first, second and third folds 87, 88, 89 as shown in FIGS. 4A and 5 and placed in box 80 where it is conveniently displayed for sale and transport by consumers. An alternative tall panel package 90 with handle 92 and front panel 93 is also possible. The tall package 90 has open front end 94 and open back end 95 to readily permit consumer inspection of drain pipe 10. The compressed drain pipe extends from male cuff 30 through first collapsed section to first bend 97 through a second compressed section to second bend 98 and third compressed section to third bend 99 and a fourth compressed section to female cuff 20. In this instance, the four compressed sections of drain pipe 10 are vertically stacked to present a different product configuration that is still easily displayed by retailers and easily carried and transported by consumers. An extremely tight bend radius is not as critical in this form of packaging, however, it is still preferred that the ratio of bend radius to maximum diameter be no more than 1.5.

FIG. 5 demonstrates a method of securing the folded drain pipe 10 where the collapsed drain pipe is bent in the middle to bring male cuff 30 and female cuff 20 together thereby forming first bend 87. In order to make this bend, tooling points such as uncollapsible rings 19 are positioned at either side of the midpoint during manufacture. After being manufactured in expanded state, the corrugated drain pipe is collapsed, however, the uncollapsible rings 19 do not collapse, and may be easily grasped manually or by tooling to accurately make the middle bend in the drain pipe. Then the cuffs 20, 30 are folded over into proximity to first bend 87 thereby creating second and third bends 88, 89, and wraps 38 are placed about the four compressed sections of drain pipe 10 thereby holding the entire folded product in place. Similar tooling points 19 are preferably placed on either side of the second and third bends. It is to be understood that packaging of the drain pipe is not required and it might be advantageously sold in a straight compressed six foot length, or with only a single bend into two compressed sections.

All publications, patents, and patent documents are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

We claim:

1. A flexible collapsible corrugated drain pipe comprising a first end section, an intermediate section of annular corrugations and a second end section, in which the corrugations comprise smaller rings joined by tuck walls connected at tuck angles to larger rings so that tuck walls are hingedly connected at larger rings to static walls extending at static angles and connecting the larger rings to next adjacent smaller ring where the ratio of the static angles to the tuck angles is less than 1.20, and wherein openings are provided in the corrugated section to allow drainage into the lumen of the pipe.

2. The flexible collapsible corrugated drain pipe of claim 1 sleeved in a geotextile sock of the expanded length of the pipe.

3. A flexible collapsible corrugated drain pipe having a ratio of bend radius to maximum diameter of less than about 1.4, wherein the pipe is folded into four adjacent compressed sections and packaged within a case having a top side with a handle, a front side, a rear side and a bottom.

4. The flexible collapsible corrugated drain pipe of claim 3 wherein the case has an open side through which the pipe is visible.

5. The flexible collapsible corrugated drain pipe of claim 3 wherein the four compressed sections of pipe are stacked vertically with respect to one another.

6. The flexible collapsible corrugated drain pipe of claim 3 wherein the four compressed sections of pipe are configured as first and second adjacent pairs of compressed sections with the first adjacent pairs of compressed sections being located above the second pair of compressed sections.

7. The flexible collapsible corrugated drain pipe of claim 3 wherein the case has left and right side panels.

8. The flexible collapsible corrugated drain pipe of claim 3 wherein tooling points are provided on each side of a fold in the pipe.

9. The flexible collapsible corrugated drain pipe of claim 3 wherein the four sections of compressed pipe each are no greater than twenty-four inches in length.

* * * * *